United States Patent

[11] 3,590,802

| [72] | Inventor | Jacob Fried |
| | | 68 Davenport, Detroit, Mich. 48201 |
| [21] | Appl. No. | 746,545 |
| [22] | Filed | July 22, 1968 |
| [45] | Patented | July 6, 1971 |

[54] AUTO-FOOD WARMER
6 Claims, 3 Drawing Figs.

| [52] | U.S. Cl. | 126/19.5 |
| [51] | Int. Cl. | F24b 1/00 |
| [50] | Field of Search | 126/19.5, 19, 33, 378 |

[56] References Cited
UNITED STATES PATENTS
| 2,683,795 | 7/1954 | Sheidler et al. | 126/19 X |
| 3,288,129 | 11/1966 | Fox | 126/19.5 |

OTHER REFERENCES
Rabenberg, German App. No. 1,236,956, Pub. 3-16-67, Class 126-19.5

*Primary Examiner*—Charles J. Myhre
*Attorney*—David A. Maxon

ABSTRACT: This invention relates to a warmer for food. The warmer is heated by the coolant passing through the engine cooling system of a motor vehicle. The warmer comprises an enclosure member; racks of pipes; conduits to the pipes; means insulating heat within the enclosure; the article supposed to be warmed supported by the racks; and the pipes in the racks transferring heat from the engine coolant flowing therein to and from the conduits.

PATENTED JUL 6 1971

3,590,802

INVENTOR
JACOB FRIED

BY David A. Maxon

ATTORNEY de of a metal that transfers heat well, both by conduction and radiation, such as copper or aluminum. The racks serve not only to support the food being warmed, but also conduct the heated fluids passing therein and also transfer heat from the fluids to the food being warmed.

AUTO-FOOD WARMER

This invention relates generally to a food warmer. More specifically, this invention relates to a food warmer carried in an automobile and heated by the engine coolant passing through pipes within the warmer that structurally support food.

Past attempts to provide suitable food warmers for delivery of food by automobile at desired temperatures have not been adequate. For example, food warmers that rely on heat transfer from exhaust systems of automobiles are dangerous. Any leak in the system could maim or kill occupants of the automobile with carbon monoxide and other noxious gases contained in the exhaust system of an automobile. Other attempts based on use of the engine coolant to provide heat in the food warmer have not been fully successful. These other attempts have lacked sufficient insulation or required elaborate devices or expensive fabrication of devices used to divert the engine coolant to a food warmer and foster heat transfer therefrom.

Accordingly, it is an object of this invention to provide a food warmer for delivery of food in automobiles at a substantially uniform desired temperature that is uncomplicated and inexpensive to manufacture and use and is reliable and safe.

This and other objects of this invention are achieved by providing a box with heat insulation media in its walls; pipes arranged in racks to provide structural support for the food being warmed and to transfer heat from engine coolant flowing therein to the food; valves and conduit dividers external to the space wherein the food is being heated; and simple means for diverting engine coolant to the food warmer and return of the engine coolant to the cooling system of the engine.

Other objects of this invention will appear in the following description and appended claims, referring to the accompanying drawings forming a part of this specification.

ON THE DRAWINGS

Before explaining the present invention in detail, it is to be understood that the invention is not limited in its application to the details in construction and arrangement of parts illustrated in the accompanying drawings since the invention is capable of other embodiments and of being practiced or carried out in various ways. Also it is to be understood that the phraseology and terminology employed herein are for the purpose of description and not of limitation.

AS SHOWN ON THE DRAWINGS

Figure 1:
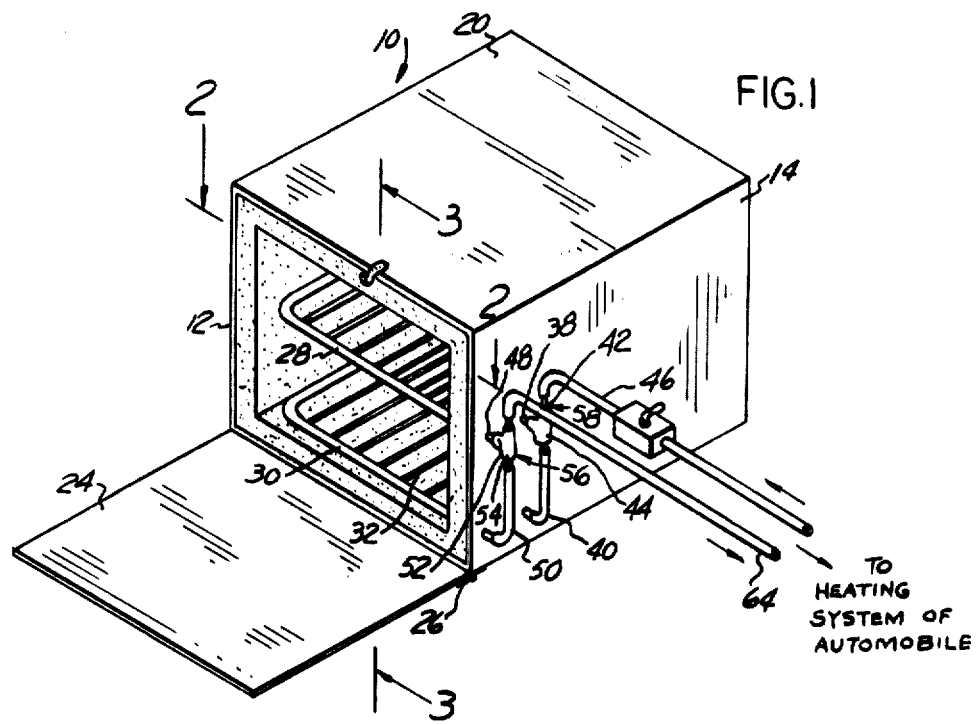
FIG. 1 is a perspective view of the invention.
Figure 2:
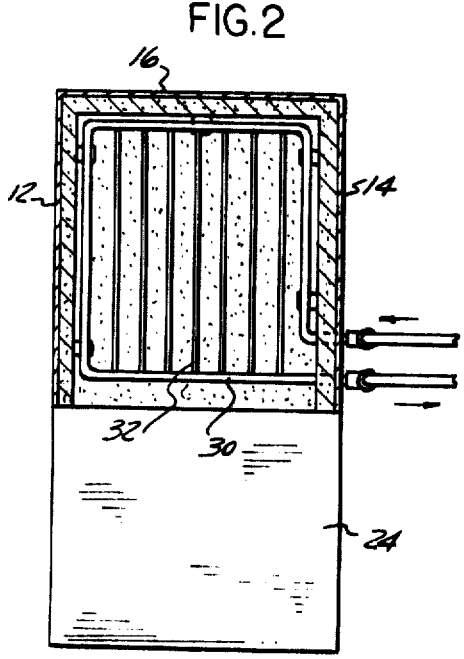
FIG. 2 is a cross-sectional view taken along line 2–2 in FIG. 1.
Figure 3:
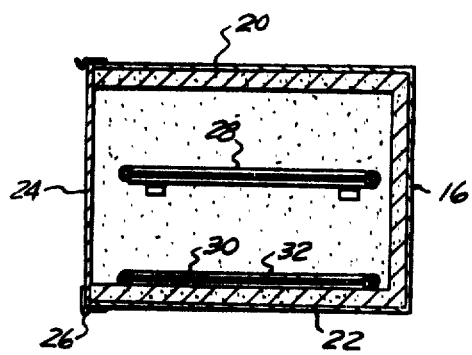
FIG. 3 is a cross-sectional view taken along line 3–3 in FIG. 1.

In the preferred embodiment of this invention, an enclosure member such as a boxlike structure 10 is provided. This box is shaped substantially like a rectangular parallel pipe. It has port and starboard walls, 12 and 14 respectively. It has a rear or aft wall 16. It has top and bottom walls 20 and 22 respectively. It has a forward door 24. The door 24 is attached by hinges 26 to the box 10 near the bottom wall 20 and 22 respectively. It has a forward door 24. The door 24 is attached by hinges 26 to the box 10 near the bottom wall 22.

The preferred material for the walls of the box 10 comprises an interior insulation material. The preferred interior insulation material is a plasticlike material such as styrofoam. The use of this material reduces odor, moisture absorption and contamination to undetectable amounts in the practice of this invention.

The preferred material for the outside of the box 10 is a glass matting with fiberglass resin. An alternative material could be wood material such as plywood.

In the interior of the box 10 a pair of racks 28 and 30 are provided. The top rack 28 as well as the bottom rack 30 comprise an array of pipes 32. The racks 28 and 30 are preferably made of a metal that transfers heat well, both by conduction and radiation, such as copper or aluminum. The racks serve not only to support the food being warmed, but also conduct the heated fluids passing therein and also transfer heat from the fluids to the food being warmed.

Each of the racks 28 and 30 are provided with fluid conduit input members 38 and 40 respectively. These members are preferably of flexible rubber or neoprene hose. These members are connected to branches 42 and 44 respectively of a "T" member 46. The "T" member is preferably made of metal such as steel.

Each of the racks 28 and 30 are connected to fluid output members 48 and 50 respectively. The members 48 and 50 are preferably hoses made of rubber or neoprene. They are connected to portions 52 and 54 of the "T" member 56. The "T" member 56 is preferably made of metal and is used to conduct fluid coolant from the immediately aforementioned fluid conduit members 48 and 50.

The end 58 of the input "T" member 46 connects to another conduit member 60. This conduit member preferably a hose of rubber or neoprene material and connects with a portion of the fluid coolant circuit in the engine cooling system or accessory thereto. Similarly, the end 62 of the output "T" member 56 connects with another conduit member 64 which is connected to the engine coolant system or accessory thereto.

More particularly, the hose 60, in the preferred embodiment of this invention, connects to the coolant system feeding the input to a cabin heater in the automobile. In a precisely analogous fashion, the output hose 64 connects to the output side of the heater back into the engine coolant system.

It can be appreciated from the foregoing description, that a food warmer has been provided wherein engine coolant passes through the conduit member 60 through the "T" member 46 and then divides through conduit members 38 and 40 to the upper and lower racks of pipes 28 and 30. Heat is transferred from the coolant passing through these pipes to the food resting on these pipes.

The coolant is then returned through the aforementioned output conduit members and associated "T" back to the point in the engine coolant circuit where return of engine coolant from the heater is made to the engine coolant system.

It can be appreciated that the transfer of heat from the coolant in the racks of pipes to the food is accomplished not only by conduction directly from the metal of the pipe to the food or container containing the food, but radiation is also provided from these pipes. More particularly, it can be appreciated that food resting on the lower racks is heated not only from the pipes in the lower rack but from the pipes in the upper rack by radiation therefrom of heat.

It can also be appreciated from the foregoing description that a food warmer for transporting food by automobile has been provided wherein there is a saving of fuel cost, cold deliveries are prevented, and fire damage is prevented. It can also be appreciated that features of the preferred embodiment of this invention include provision of heat insulation, parallel flow to pipes serving as racks, these racks being of a solid one piece construction of conduits for fluid from which heat is transferred by radiation, convection and conduction to the food. These features will increase customer satisfaction by reliably transporting food heated to desired temperatures.

I claim:

1. In a heat transfer device for warming articles in an automobile by transferring heat from an engine coolant to the articles to be warmed, the improvements of:

an enclosure member;
a top rack of pipes within said enclosure member;
a bottom rack of pipes within said enclosure member;
input conduits to said racks;
output conduits from said racks;
means insulating heat within said enclosure member;
said input conduits transferring engine coolant to said racks;
said output conduits transferring engine coolant from said racks to the engine cooling system of said automobile;

said articles being structurally supported by said racks;
said racks transferring heat from engine coolant flowing therein to said articles.

2. The apparatus of claim 1 wherein each of said input conduits is connected by a "T" member at one end thereof and at the other end thereof are each attached to a different one of said racks.

3. The apparatus of claim 1 wherein each of said output conduits is connected to a different one of said racks.

4. The apparatus of claim 1 wherein said racks are fed coolant in parallel flow.

5. The apparatus of claim 1 wherein said racks comprise an array of pipes spaced at a distance from one another allowing convection of heated air between them.

6. The apparatus of claim 5 wherein said pipes are shaped in such a manner that the area of contact between said pipes and articles resting on said pipes is a small fraction of the total exterior exposed area of the pipes for heat exchange.